(12) United States Patent
Kunimi et al.

(10) Patent No.: US 7,439,315 B2
(45) Date of Patent: Oct. 21, 2008

(54) POLYMER FILM AND METHOD FOR PRODUCING THE SAME

(75) Inventors: Nobutaka Kunimi, Tsukuba (JP); Jun Kawahara, Tokyo (JP); Akinori Nakano, Tama (JP); Keizo Kinoshita, Tokyo (JP)

(73) Assignee: NEC Corporation, Tokyo (JP)

( * ) Notice: Subject to any disclaimer, the term of this patent is extended or adjusted under 35 U.S.C. 154(b) by 421 days.

(21) Appl. No.: 11/186,856

(22) Filed: Jul. 22, 2005

(65) Prior Publication Data
US 2006/0052560 A1 Mar. 9, 2006

(30) Foreign Application Priority Data
Jul. 23, 2004 (JP) ............................ P2004-215394

(51) Int. Cl.
*C08F 30/08* (2006.01)
*C08F 38/02* (2006.01)

(52) U.S. Cl. .................... 526/285; 526/279; 526/348.1; 526/308

(58) Field of Classification Search ................ 526/279, 526/348.1, 308, 285
See application file for complete search history.

(56) References Cited

U.S. PATENT DOCUMENTS

| 6,261,974 | B1 | 7/2001 | Kawahara et al. |
| 2004/0063883 | A1* | 4/2004 | Hayashi et al. ............ 526/279 |

FOREIGN PATENT DOCUMENTS

| JP | 2000-12532 | A | 1/2000 |
| JP | 3190886 | B2 | 5/2001 |

OTHER PUBLICATIONS

Ward et al., Solid Phase Processing of Polymers, Hanser Publishers, 2000.*

* cited by examiner

*Primary Examiner*—Ling-Siu Choi
(74) *Attorney, Agent, or Firm*—Birch, Stewart, Kolasch & Birch, LLP

(57) ABSTRACT

A copolymer film having a decreased dielectric constant which is produced by supplying at least two organic monomers as raw materials, forming a film of a copolymer comprising a backbone based on said at least two monomers on a surface of a substrate, and heating the copolymer film at a temperature higher than a temperature at which the copolymer film is formed.

11 Claims, 2 Drawing Sheets

POLYMER FILM AND METHOD FOR PRODUCING THE SAME

FIELD OF THE INVENTION

The present invention relates to a polymer film and a method for producing the same. In particular, the present invention relates to a polymer film, which is preferably used as an interlayer insulation film with a low dielectric constant for insulating multilayer wirings of a semiconductor integrated circuit, and a method for producing the same.

PRIOR ART

With the reduction of a circuit size in the designing rule of a semiconductor integrated circuit, a distance between adjacent wirings of the semiconductor integrated circuit has been decreased. As a result, a delay caused by a parasitic capacity between the wirings relatively increases, and the deterioration of a high speed operation performance due to such a delay becomes actual. To cope with this problem, it is required to decrease a capacity between wirings.

To decrease the capacity between wirings, the use of an insulation material with a smaller dielectric constant is studied. Among others, the films of organic polymers are promising as insulation materials with a small dielectric constant, since the organic polymers themselves have a low specific dielectric constant.

For example, JP 3190886 B (JP-A-2000-012532) discloses a method for producing an organic polymer film on the surface of a substrate by a plasma polymerization method, that is, a method comprising the steps of vaporizing an organic compound as a raw material, transporting the vaporized compound with a carrier gas, passing the vaporized compound through plasma generated in a reaction chamber under a reduced pressure and spraying it on the surface of the heated substrate to form the organic polymer film thereon.

In the plasma polymerization method described above, the raw material compound is excited to have an increased reactivity while it passes through the plasma, and reaches the surface of the substrate in a state having the increased reactivity. Since the excited raw material compound is polymerized on the substrate, a polymer film formed on the substrate has a backbone reflecting the structure of the raw material compound. Thus, a polymer film can have a different chemical structure when a different compound is used as a raw material for the plasma polymerization method. Accordingly, the physical properties of the polymer film can be remarkably improved by selecting a raw material compound which can provide a chemical structure realizing physical properties required for an interlayer insulation film with a low dielectric constant and polymerizing such a compound by the plasma polymerization method.

Interlayer insulation films with a low dielectric constant are required to have diverse physical properties such as a low specific dielectric constant, high heat resistance, high mechanical strength, good adhesiveness to semiconductive materials, etc. With the recent progress of semiconductor technology, the required properties are sophisticated. In particular, it is required for a dielectric constant, which is one of the physical properties targeted, to be further improved.

SUMMARY OF THE INVENTION

An object of the present invention is to provide a polymer film having a further decreased dielectric constant.

Another object of the present invention is to provide a method for producing such a polymer film having a further decreased dielectric constant.

Accordingly, the present invention provides a method for producing a copolymer film comprising the steps of:
  supplying at least two organic monomers as raw materials,
  forming a film of a copolymer comprising a backbone based on said at least two monomers on a surface of a substrate, and
  heating the copolymer film at a temperature higher than a temperature at which the copolymer film is formed.

Furthermore, the present invention provides a copolymer film produced by such a method of the present invention.

The method of the present invention can form an organic polymer film having pores inside the film by a vapor-phase growth method and control the contents of the raw material monomers in the copolymer by suitably selecting the ratio of the raw material monomers supplied. Thereby, the porosity of the copolymer film can be easily controlled. Accordingly, the dielectric constant of the copolymer film produced by the vapor-phase growth method is easily controlled.

DETAILED DESCRIPTION OF THE PREFERRED EMBODIMENTS

Figure 1:
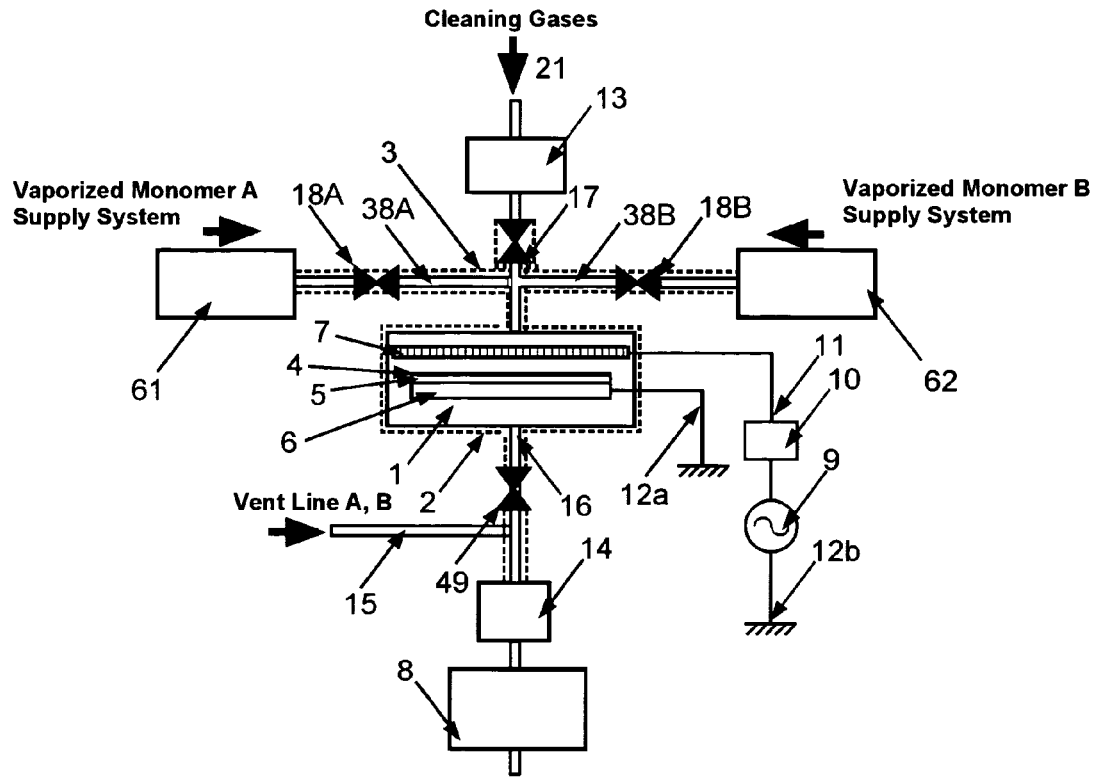
FIG. 1 schematically shows one example of an apparatus for producing a polymer film, which can be used to produce a copolymer film according to the present invention.

At least two organic monomers are used as raw materials in the method for producing a polymer film according to the present invention. The kinds of the organic monomers used are not limited. Preferably, the organic monomers are compounds which can be polymerized by a vapor-phase growth method to form an organic polymer film. In particular, compounds having one or more unsaturated bonds (i.e. double bonds and/or triple bonds) are advantageously used since they have high reactivity and effectively form polymer films. Among them, organic compounds having one or more carbon-carbon double or triple bonds are more preferable as the raw materials of interlayer insulation films with a low dielectric constant, namely, as the organic monomers to be copolymerized by the method of the present invention, since they can form a crosslinked structure mainly comprising hydrocarbons when they are polymerized.

At least two organic monomers used as the raw materials in the method for producing a polymer film according to the present invention are preferably compounds which provide organic polymer films having greatly different heat resistance, when they are independently polymerized by the vapor-phase growth method to form respective organic polymer films. The heat resistance of the organic polymer film is mainly governed by the chemical structure in the film. Thus, the greatly different heat resistance of organic polymer films may suggest that the polymer films each formed from a single organic monomer have greatly different chemical structures therein. Therefore, at least two organic monomers as the raw materials of the polymer film preferably have sufficiently different chemical structures for forming the different chemical structures in the polymer film. That is, at least two organic monomers preferably have chemical structures such that they provide greatly different chemical structures in the organic polymer films produced from them. More preferably, at least two monomers are selected so that a copolymer film formed from them have one chemical structure which can be decomposed and another chemical structure which cannot be decomposed, in a subsequent heating step.

In the method for producing a polymer film according to the present invention, a copolymer film, which comprises backbones having structures derived from at least two organic polymers, is formed on the surface of a substrate, and thus the copolymer film formed contains the backbones having structures reflecting the respective chemical structures of the organic monomers. Since the interlayer insulation films with a low dielectric constant should have high film uniformity, preferably they uniformly contain the chemical structure which can be decomposed and the chemical structure which cannot be decomposed in the heating step. To effectively form such structures of the polymer film, at least two organic monomers are preferably copolymerized each other. That is, at least two organic monomers are preferably copolymerized when they are polymerized by the vapor-phase growth method.

Furthermore, the copolymer film comprising the backbones based on the chemical structures of at least two monomers preferably contain a part which consists of at least two chemical structures having different heat resistance described above, which are derived from at least two monomers used as the raw materials. In particular, the chemical structures in the polymer film preferably have greatly different heat resistance. That is, the copolymer film which is firstly formed in the method of the present invention preferably comprises one chemical structure which can be decomposed and another chemical structure which cannot be decomposed in a subsequent heating step.

One example of a chemical structure with higher heat resistance is an aromatic hydrocarbon structure. Examples of organic monomers which provide such an aromatic hydrocarbon structure include aromatic compounds, organic silicon compounds having a carbon-carbon triple bond, etc.

One examples of a chemical structure with lower heat resistance is an aliphatic hydrocarbon structure. Examples of organic monomers which provide such an aliphatic hydrocarbon structure include aliphatic hydrocarbons, etc.

In one particularly preferable embodiment of the present invention, an aromatic compound or an organic silicon compound having a carbon-carbon triple bond is used as one of the organic monomers, and an aliphatic hydrocarbon compound is used as the other one of the organic monomers.

Preferably, the aromatic compound or the organic compound having at least one carbon-carbon triple bond is a compound of the formula (1), (2) or (3):

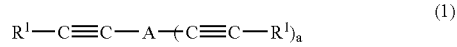

(1)

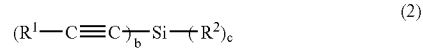

(2)

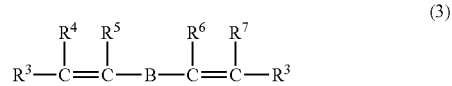

(3)

wherein a is an integer of 0 to 3, b is an integer of 1 to 4, c is an integer of 0 to 3 provided that the sum of b and c (b+c) is 4, A represents a mono- to tetravalent aromatic hydrocarbon group or a mono- to tetravalent heterocyclic aromatic group, $R^1$ represent independently each other a hydrogen atom or a silyl group which may optionally have at least one substituent, provided that two or more $R^1$ groups are present in one molecule, they may be the same or different, $R^2$ represents an alkyl group having 1 to 4 carbon atoms, an alkenyl group having 2 to 4 carbon atoms, an alkynyl group having 2 to 4 carbon atoms or an alkoxy group having 1 to 4 carbon atom, B is a divalent aromatic hydrocarbon group or a divalent group of the formula (4):

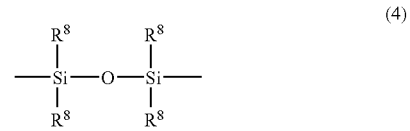

(4)

in which four $R^8$ groups represent independently each other a hydrogen atom or a methyl group, two $R^3$ groups represent independently each other a hydrogen atom or a hydrocarbon group having 1 to 10 carbon atoms, and $R^4$ to $R^7$ groups represent independently each other a hydrogen atom or an aliphatic hydrocarbon group having 1 to 10 carbon atoms.

Examples of the mono- to tetravalent aromatic hydrocarbon groups for A in the formula (1) are those derived from benzene, naphthalene, anthracene, phenanthrene, fluorene, etc. Examples of the heterocyclic aromatic groups for A in the formula (1) include those derived from nitrogen-containing hetero rings such as pyridine, piperazine, piperidine, pyrazine, imidazole, pyrrolidine, pyrrole, diazine, triazine, pyrimidine, purine, etc.; and oxygen- or sulfur-containing hetero rings such as furane, thiophene, etc.

The aromatic hydrocarbon groups and heterocylic aromatic groups may optionally be substituted with at least one substituent selected from the group consisting of an alkyl group having 1 to 10 carbon atoms, an alkoxyl group having 1 to 10 carbon atoms, an acyl group having 1 to 10 carbon atoms, an aryl group having 6 to 20 carbon atoms and an aryloxy group having 6 to 20 carbon atoms. Among these substituents, an alkyl group having 1 to 10 carbon atoms, in particular, methyl, ethyl, n-propyl, isopropyl, n-butyl, isobutyl, sec-butyl and tert-butyl are preferable.

In the formula (1), suffix a is an integer of 0 to 3, preferably 0 or 1. When suffix a is 0 or 1, A is a mono- or divalent organic group. In such a case, A is preferably an aromatic hydrocarbon group, more preferably a mono- or divalent group derived from benzene or naphthalene for example, phenyl, naphthyl, phenylene, naphtylene, etc.

An optionally substituted silyl group as $R^1$ in the formula (1) may be a silyl group substituted with a saturated or unsaturated hydrocarbon group. Specific group of such a substituted silyl group include trimethylsilyl, dimethylethylsilly, methyldiethylsilyl, triethylsilyl, dimethylvinylsilyl, methyldivinylsilyl, trivinylsilyl, triallylsilyl, etc.

$R^1$ is preferably a hydrogen atom, trimethylsilyl or trivinylsilyl. In particular, a hydrogen atom or trimethylsilyl is preferable.

When the suffix a is an integer of 1 to 3, the $R^1$ groups may be the same or different.

Preferable examples of the compound of the formula (1) include phenylacetylene, (methylphenyl)acetylene, (ethylphenyl)acetylene, (propylphenyl)acetylene, (butylphenyl) acetylene, trimethylsilylethynylbenzene, 1,2-diethynylbenzene, 1,3-diethynylbenzene, 1,4-diethynylbenzene, methyldiethynylbenzene, ethyldiethynylbenzene, propyldiethynylbenzene, butyldiethynylbenzene, 1,2-di(tert-butylethynyl)benzene, 1,3-di(tert-butylethynyl)benzene, 1,4-di(tert-butylethynyl)benzene, 1,2-di(trimethylsilylethynyl)benzene, 1,3-di(trimethylsilylethynyl)benzene, 1,4-di(trimethylsilylethynyl)benzene, etc. Among them, phenylacetylene, trimethylsilylethynylbenzene, 1,2-diethynylbenzene, 1,3-diethynylbenzene, 1,4-diethynylbenzene, 1,2-di(trimethylsilylethynyl)benzene, 1,3-di(trimethylsilylethynyl)benzene, 1,4-di(trimethylsilylethynyl)benzene, etc. are more preferable.

In the formula (2), the suffix b is an integer of 1 to 4, and the suffix c is an integer of 0 to 3, provided that the sum of b and c is 4. Preferably, the suffix b is 1 or 2.

The $R^1$ group in the formula (2) may be the same as the $R^1$ group in the formula (1). When the suffix b is 2, 3 or 4, two or more $R^1$ group present in the formula (2) may be the same or different.

In the formula (2), $R^2$ is an alkyl group having 1 to 4 carbon atoms, an alkenyl group having 2 to 4 carbon atoms, an alkynyl group having 2 to 4 carbon atoms or an alkoxy group having 1 to 4 carbon atom. Specific examples of the alkyl group having 1 to 4 carbon atoms include methyl, ethyl, n-propyl, isopropyl n-butyl, isobutyl, sec-butyl, tert-butyl, etc. Specific examples of the alkenyl group having 2 to 4 carbon atoms include vinyl, allyl, etc. Specific examples of the alkynyl group having 2 to 4, carbon atoms include ethynyl, propargyl, etc. Specific examples of the alkoxy group having 1 to 4 carbon atoms include methoxy, ethoxy, etc. Among them, methyl, ethyl, vinyl, allyl, ethynyl, propargyl, methoxy and ethoxy are more preferable as $R^2$.

Preferable examples of the compound of the formula (2) include trimethylsilylacetylene, bis(trimethylsilyl)acetylene, triethylsilylacetylene, bis(triethylsilyl)acetylene, diethynyldimethylsilane, diethynyldiethylsilane, diethynyldimethoxysilane, diethynyldiethoxysilane, etc. Among them, trimethylsilylacetylene and diethynyldimethylsilane are preferable.

B in the formula (3) represents a divalent aromatic hydrocarbon group or a group of the formula (4) described above.

Examples of the aromatic hydrocarbon group as B include divalent groups comprising benzene, naphthalane, anthracene, phenanthrene, fluorene, etc. as a backbone. Specific examples of the aromatic hydrocarbon groups include phenylene, naphthylene, anthranylene, fruolenylene, etc.

The divalent aromatic hydrocarbon group may optionally be substituted with at least one substituent selected from the group consisting of an alkyl group having 1 to 10 carbon atoms, an alkoxyl group having 1 to 10 carbon atoms, an acyl group having 1 to 10 carbon atoms, an aryl group having 6 to 20 carbon atoms and an aryloxy group having 6 to 20 carbon atoms. Among these substituents, methyl, ethyl, n-propyl, isopropyl, n-butyl, isobutyl, sec-butyl and tert-butyl are preferable.

Preferable examples of B include phenylene, naphtylene and a group of the formula (4). In particular, a phenylene group or a group of the formula (4) in which all R8 groups are methyl groups is preferable.

A hydrocarbon group as $R^3$ is preferably a group of the formula (5) or (6):

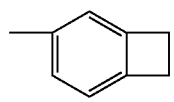

(5)

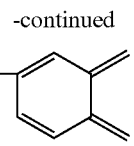

(6)

Among them, the group of the formula (5) is more preferable.

Examples of the aliphatic hydrocarbon groups as $R^4$ to $R^7$ in the formula (3) include saturated or unsaturated, linear or branched hydrocarbon groups having 1 to 6 carbon atoms. The position of the unsaturated bond is not limited, if present.

Specific examples of the aliphatic hydrocarbon group having 1 to 6 carbon atoms include methyl, ethyl, n-propyl, isopropyl, n-butyl, isobutyl, sec-butyl, tert-butyl, vinyl, allyl, ethynyl, propargyl, etc.

Examples of the compound of the formula (3) include 1,3-divinylbenezene, 1,4-divinylbenzene, methyldivinylbenzene, ethyldivinylbenzene, propyldivinylbenzene, butyldivinylbenzene, and a compound of the formula (7):

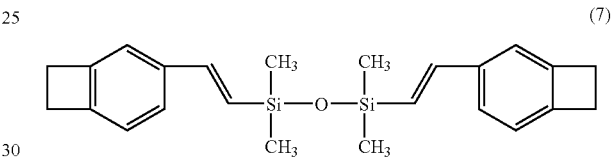

(7)

Among them, a compound of the formula (7) is preferable.

Among the compounds of the formulas (1), (2) and (3), the compound of the formula (3) is more preferable.

In a particularly preferable embodiment of the present invention, the aromatic compound or the organic silicon compound having a carbon-carbon triple bond as one organic monomer and the aliphatic hydrocarbon as the other organic monomer are used. The aliphatic hydrocarbon may not be limited and is preferably an aliphatic hydrocarbon having at least one carbon-carbon unsaturated bond.

Such an aliphatic hydrocarbon may be an acyclic or cyclic compound. In the case of an acyclic compound, it may be a linear or branched compound, and in the case of a cyclic compound, it may be a monocyclic or polycyclic compound. Furthermore, the number of carbon atoms of the compound is not limited, and is preferably from 2 to 20. The carbon-carbon unsaturated bond may be a carbon-carbon double bond or a carbon-carbon triple bond, and the position of the unsaturated bond is not limited.

Specific examples of the aliphatic hydrocarbon include ethylene, propene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 2-butene, 2-pentene, 2-hexene, 2-heptene, 3-heptene, 2-octene, 3-octene, 4-octene, 2-nonene, 3-nonene, 4-nonene, 5-decene, 7-tetradecene, 3-methyl-1-butene, 3,3-dimethyl-1-butene, 3-methyl-1-pentene, 4-methyl-1-pentene, 2-methylpropene, 2-methyl-1-butene, 2-ethyl-1-butene, 2,3-dimethyl-1-butene, 2,3,3-trimethyl-1-butene, 2-methyl-1-pentene, 2,4,4-trimethyl-1-pentene, 2-methyl-1-hexene, 2-methyl-1-heptene, 2-methyl-1-undecene, 4-methyl-2-pentene, 2-methyl-2-butene, 2-methyl-2-pentene, 3-methyl-2-pentene, 2,4,4-trimethyl-2-pentene, 2-methyl-2-heptene, 2,3-dimethyl-2-butene, 2,3,4-trimethyl-2-pentene, allene, 3-methyl-1,2-butadiene, tetramethylallene, 1,3-butadiene, isoprene, 2,3-dimethyl-1,3-butadiene, piperylene, 2-methyl-1,3-pentadiene, 3-methyl-1,3-pentadiene, 2,4-dimethyl-1,3-pentadiene, 1,3-hexadiene, 2,4-hexadiene, 2,5-dimethyl-2,4-hexadiene, 1,3,5-hexatriene, 2,6-dimethyl-2,4,6-octatriene, myrcene, 1,4-pentadiene, 2-methyl-1,4-pentadiene, 3-methyl-1,4-pentadiene, 1,4-hexadiene, 1,5-hexadiene, 2-methyl-1,5-hexadiene, 2,5-dimethyl-1,5-hexadiene, 1,6-heptadiene, 1,7-octadiene, 7-methyl-1,6-octadiene, 1,8-nonadiene, 1,9-decadiene, 1,13-tetradecadiene, 1,5,9-decatriene, cyclopentene, cyclohexene, cycloheptene, cyclooctene, cyclodecene, 1-methyl-1-cyclopentene, 1-methyl-1-cyclohexene, 4-methyl-1-cyclohexene, 1-isopropyl-1-cyclohexene, 1-tert-butyl-1-cyclohexene, 1,4-diisopropyl-1-cyclohexene, 1,3,5-trimethyl-1-cyclohexene, 1,3-cyclohexadiene, 1,4-cyclohexadiene, 1,3-cycloheptadiene, 1,3-cyclooctadiene, 1,5-cyclooctadiene, 1,2,3,4-tetramethyl-1,3-cyclopentadiene, pentamethylcyclopentadiene, ethyltetramethylcyclopentadiene, 1-methyl-1,4-cyclohexadiene, α-terpinene, γ-terpinene, 1,5-dimethyl-1,5-cyclooctadiene, cycloheptatriene, 1,5,9-cyclododecatriene, cyclooctatetraene, methylenecyclobutane, methylenecyclopentane, methylenecyclohexane, ethylidenecyclohexane, vinylcyclopentane, allylcyclopentane, vinylcyclohexane, 1,2,4-trivinylcyclohexane, 4-vinyl-1-cyclohexene, dipentene, limonene, 2-carene, 3-carene, α-pinene, norbornene, 1,2,3,4,5,6,7,8-octahydronaphthalene, norbornadiene, bicyclo[4.3.0]nona-3,6-diene, dicyclopentadiene, dimethyldicyclopentadiene, hexahydronaphthalene, β-pinene, camphene, 5-methylene-2-norbornene, 5-ethylidene-2-norbornene, 5-vinyl-2-norbornene, 6,6-dimethylfulvalene, acetylene, propyne, 1-butyne, 2-butyne, 3-methyl-1-butyne, 2-methyl-1-buten-3-yne, 1-pentyne, 2-pentyne, 3,3-dimethyl-1-butyne, 3-methyl-1-pentyne, 2-hexyne, 3-hexyne, 1,6-heptadiyne, 1-heptyne, 2-heptyne, 1,7-octadiyne, 1,8-nonadiyne, 1-decyne, 4-methyl-1-pentyne, 3,3-dimethyl-1-pentyne, 3,4-dimethyl-1-pentyne, 4,4-dimethyl-1-pentyne, 1-buten-3-yne, 1,3-butadiyne, 1-penten-4-yne, cyclopentylacetylene, cyclohexylacetyene, 1,4-pentadiyne, 3-methyl-1,4-pentadiyne, 3,3-dimethyl-1,4-pentadiyne, 1,5-hexadiyne, 3-methyl-1,5-hexadiyne, 3,3-dimethyl-1,5-hexadiyne, 3,4-dimethyl-1,5-hexadiyne, 4,4-dimethyl-1,5-hexadiyne, 1,3-diethynylcyclopentane, 1,3-diethynylcyclohexane, 1,4-diethynylcyclohexane, etc. Among them, 1,2,4-trivinylcyclohexane, camphene, 5-methylene-2-norbornene, 5-ethylidene-2-norbornene, 5-vinyl-2-norbornene, 1-hexyne and 1-heptyne are preferable.

When the polymer film is produced by the method of the present invention, a number of micropores may be formed inside the polymer film, thereby a low dielectric constant, which is sought in the case of an interlayer insulating film, can be further decreased.

The method for producing a polymer film according to the present invention comprises a step for forming a film of a copolymer comprising a backbone based on at least two organic monomers, and a step for heating the copolymer film at a temperature (heat treatment temperature) preferably at least 100° C. higher than a temperature at which the copolymer film is formed.

Preferably, when the copolymer film is subjected to the heat treatment step, the parts having lower heat resistance disappear, while only the parts having higher heat resistance remain in the copolymer film. In such a case, the disappearing parts leave voids so that the thermally treated copolymer film can have a further decreased dielectric constant. Furthermore, when the organic monomers as the raw materials are suitably selected, the low dielectric constant and the high mechanical properties are both attained.

In addition, when a ratio of at least two raw material monomers is adequately adjusted, the contents of the monomers in the copolymer film can be controlled. As a result, the porosity of the copolymer film can be easily controlled. Thereby, the dielectric constant of the copolymer film can be easily controlled.

Now, one example of an apparatus for producing an polymer film by the method of the present invention is explained by making reference to FIG. 1, which schematically shows such an apparatus. Hereinafter, a method for producing a copolymer film using two raw materials is explained. However, a polymer film can be produced from three or more raw materials by an analogous method thereto.

In FIG. 1, a reaction chamber 1 is depressurized with a vacuum pump 8, and a substrate-heating member 6 is provided inside the reaction chamber 1. As a base material on which a copolymer film is formed, a semiconductor substrate 5 is fixed to the upper surface of the substrate-heating member 6. Organic compounds A and B as raw materials are vaporized in vaporizing supplying systems 61, 62, respectively, and the vapors of organic compounds A and B are supplied to the reaction chamber 1 together with carrier gasses via vaporized compound-supply pipes 38A, 38B and valves 18A, 18B, respectively. Before reaching the reaction chamber 1, the pipe walls of the pipes 38A, 38B are heated with a heater 3 so that the pipe wall temperatures are maintained at such a temperature that the partial pressures of organic compounds A and B are always lower than the respective equilibrium vapor pressures thereof at the pipe wall temperature. The vapors of organic compounds A and B, which are transported with the carrier gas, are supplied to a shower head 7 in the reaction chamber 1 and mixed, and the vapor mixture is sprayed on the surface of the substrate 5. Between the shower head 7 and the substrate-heating member 6, a RF power is applied from a RF power source 9 to induce plasma. Accordingly, the molecules of organic compounds A and B are excited while they are passing through the plasma generated and then reach the surface of the substrate in the activated state. Then, the molecules are deposited on the surface of the substrate 5 which is heated with the substrate-heating member 6, and the thermal energy is imparted to the already activated molecules of organic compounds A and B so that they are quickly copolymerized. Consequently, an insulation film 4 of the copolymer comprising organic compounds A and B grows on the surface of the semiconductor substrate 5. Thereafter, the temperature of the substrate 6 is raised to a temperature higher than the temperature at which the insulation film 4 of the copolymer has been formed, and the insulation film 4 is heat treated for a predetermined period of time.

After organic compounds A and B, which have been activated with plasma, are adsorbed to a substrate, a part of the molecules of organic compounds A and B are desorbed. Since this "desorption" and a "polymerization reaction" are competitive, the probability of the desorption is high, if only the thermal process is employed. When plural raw materials are used, the probabilities (or rates) of desorption of the raw materials are different. Therefore, the ratio of the raw materials in the copolymer film should be controlled by adjusting the supply ratio of the raw materials in a wide range by taking the probabilities of desorption of the raw materials into account.

In contrast, in the case of a "plasma polymerization", organic compounds A and B, which have been activated can be quickly copolymerized when they are adsorbed on the substrate. Thus, the desorption of the molecules of organic compounds A and B has minimal influence on the composition of the copolymer. Consequently, the ratio of organic compounds A and B in the copolymer can be easily controlled.

In some cases, during the activation with plasma, a part of the activated raw material compounds may be oligomerized in a gas phase to form dimers, trimers, etc., which are adsorbed on the surface of the substrate. In such cases, since raw material compounds A and B are mixed in an atmosphere under reduced pressure in which the molecules of the compounds have large mobility, the dimers, trimers or oligomers have a composition corresponding to the mixing ratio of organic compounds A and B in the raw material gas. Accordingly, the insulation film of a copolymer which homogeneously comprises the units derived from organic compounds A and B can be obtained. When plural raw material compounds having different equilibrium vapor pressures (saturated vapor pressures) with different orders of magnitude, the influence of the difference of the probability of desorption may increase. However, when dimers, trimers or oligomers are formed by intentionally oligomerizing a part of the raw material compounds in the plasma, they have much smaller equilibrium vapor pressure than the monomers, so that the influence of the desorption can be avoided. For example, in a case where the equilibrium vapor pressures of the raw materials are different by about three figures, when the above method is used, the difference of the probabilities of desorption is substantially negligible. In such a case, the distribution of the composition in the insulation film of the copolymer causes no practical problem.

The raw materials are sprayed in the form of a mixed gas on the surface of the substrate. It is necessary for the mixing ratio of the raw material organic compounds contained in the mixed gas to be made substantially the same anywhere on the surface of the substrate. The raw materials may be uniformly mixed in the reaction chamber by, for example, mixing them with the shower head 7 placed in the reaction chamber. Alternatively, the raw materials may be uniformly mixed in a passageway before they are introduced in the reaction chamber, and then introduced in the reaction chamber. To uniformly mix the raw materials in the passageway, the flows of the raw materials are combined in a pipe, or a mixing chamber is placed in the apparatus and the raw materials are mixed in the mixing chamber while the materials are retained therein.

The unreacted raw materials do not deposit or condense on the walls of the reaction chamber 1, since the reaction chamber 1 is depressurized with the vacuum pump 8 and the wall of the reaction chamber 1 is heated with a heater 2 like the vaporized compound-supply pipes 38A, 38B. Therefore, the unreacted raw materials in a gas state reach a cold trap 14 via a discharging pipe 16 which is heated with a heater. In the cold trap 14, both raw materials A and B in the gas state condense to liquefy or solidify since the temperature on the inside surface of the cold trap is sufficiently low. As a result, the unreacted raw materials are recovered and removed in the cold trap 14, while the carrier gas from which the raw materials have been removed, that is, the gas utilized to generate the plasma, is transported to the vacuum pump 8.

Figure 2:
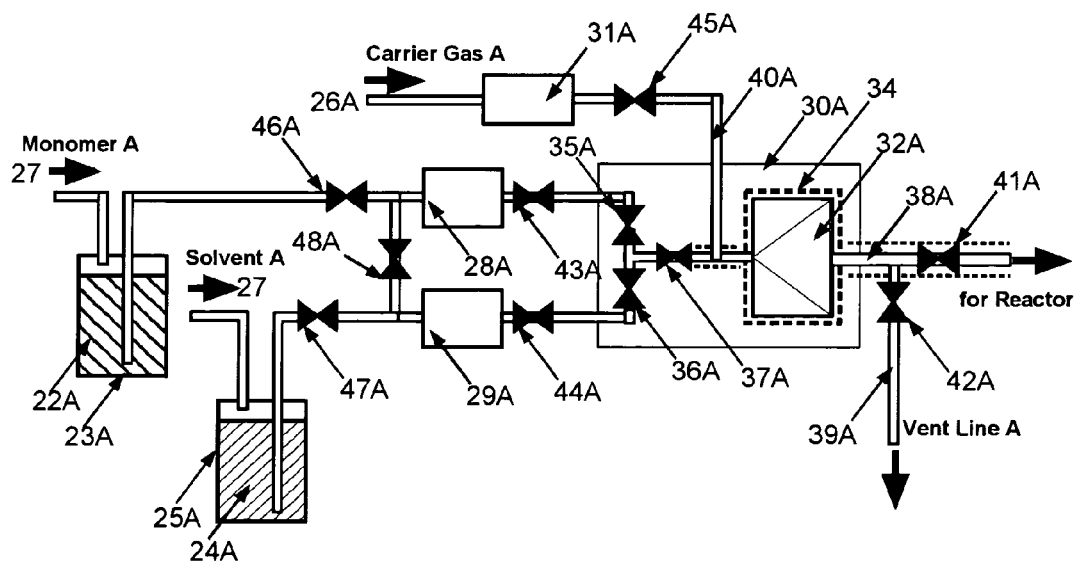
FIG. 2 schematically shows a system for vaporizing a liquid raw material and supplying the vaporized raw material to a reaction chamber together with a carrier gas.

FIG. 2 schematically shows a system for vaporizing a liquid organic compound and supplying the vaporized compound to the reaction chamber together with a carrier gas, when an organic compound used to form a polymer film is liquid at room temperature. FIG. 2 shows the flow of the organic compound (monomer) A from its vaporization in a vaporization controller to just before the supply to the reaction chamber.

The organic compound 22A is supplied to a vaporization controller 30A via a valve 46A, a liquid flow meter 28A and a valve 43A. Then, the compound 22A is supplied to a vaporizing chamber 32A via a vaporization control valve 35A and a valve 37A in the controller, both of which are controlled with feedback signals from the liquid flow meter 28A for the compound 22A. Separately, a carrier gas 26A is supplied to the controller 30A via a valve 45A. Then, the carrier gas 26A and the compound 22A are mixed just upstream the vaporizing chamber 32A. The compound 22A, which is mixed with the carrier gas 26A and supplied to the vaporizing chamber 32A, is continuously vaporized since it is heated with a thermal energy generated with a heater 34 and also the vaporizing chamber 32A is depressurized. That is, the cooling of the compound 22A, which is caused by a thermal energy consumed as a heat of evaporation and the volume expansion of the carrier gas due to the sudden drop of the pressure, is compensated with a thermal energy supplied by heating with the heater 34. Therefore, the vaporized compound 22A is heated to a sufficiently high temperature and then supplied to the reaction chamber 1 via the vaporized compound-supply pipe 38A and the valve 18A which are heated with the heater 3.

When the organic compounds used in the production of a copolymer film are solids at room temperature, a suitable vaporizing-supplying system may be selected as in the case of the liquid compounds.

As explained above, the organic compounds, which may be liquid or solid at room temperature, can be supplied in the gas state to the reaction chamber with quickly changing a supply rate to a desired rate by choosing a suitable vaporizing supplying system. If the compounds, which are in the gas state at room temperature, can be used, they may be supplied in the same manner as in the case of supplying conventional raw material gases.

The carrier gas used in the method of the present invention may be any gas inert to the compound(s) to be mixed, for example, helium gas, argon gas, neon gas, etc.

EXAMPLES

The present invention will be illustrated by the following example, which does not limit the scope of the present invention in any way.

Example 1

This Example explains a method for producing a copolymer film using the compound of the formula (7) as an organic compound A and trivinylcyclohexane as an organic compound B.

In the initial state of the vaporization controller of the apparatus for forming a polymer film (FIGS. 1 and 2), the valves 37, 41 and 49 are "opened", and the reaction chamber 1, discharge pipe 16, effluent pipe 15, vaporizing chambers 32 and vaporized compound-supply pipes 38 are evacuated with the vacuum pump 8.

An vaporizing temperature is preferably a sufficiently high temperature for attaining required supply amounts of organic compounds A and B, but should not be so high as to cause any denaturation such as decomposition or polymerization of organic compounds A and B, and the clogging of the pipes due to such denaturation in the pipes through which organic compounds A and B to be vaporized are transported to the vaporizing chambers. The pipes such as the vaporized compound-supply pipes 38 and the like, which are heated with the heater 3, should be made of materials which can withstand such a heating temperature, or the heating temperature is selected so that the pipe materials can withstand such a heating temperature. The temperatures of the pipes being heated are monitored with thermocouples attached to various positions of the pipes, and the outputs of the heaters for heating the pipes are controlled so that the temperatures of the pipes are maintained in preset temperature ranges. Then, the valve 45 of the vaporizing-supplying system shown in FIG. 2 is "opened", and the carrier gas 26 (e.g. helium gas) is supplied to the vaporization controller 30 via a carrier gas-supplying pipe 40 using a gas flow-controller 31, and further flowed to the reaction chamber 1 via the vaporized compound-supply pipe 38 and the valve 18. Finally, the mixture of the unreacted organic compounds A and B and the carrier gas is discharged outside the reaction chamber with the vacuum pump 14 via the discharge pipe 16. In this step, the vaporizing temperature is set to 80° C. The flow rate of the helium carrier gas is adjusted at 500 sccm. Under such conditions, the total pressure P in the vaporization controller is 7 Torr, and the internal pressure of the reaction chamber 1 is 2.0 Torr. The silicon substrate 5 (semiconductor substrate) on which an integrated circuit is printed is heated at 250° C. with the substrate heater 6 placed in the reaction chamber 1. The substrate temperature during the formation of a polymer film is preferably in the range from 200° C. to 350° C.

With the organic monomer-vaporizing supplying system 61 shown in FIG. 2, the vaporized organic compounds A and B are supplied together with the carrier gas to the reaction chamber 1 via the vaporized compound-supply pipes 38. The mixed gas containing vaporized organic compounds A and B is distributed with the shower head 7 in the reaction chamber 1 and sprayed on the surface of the substrate 5.

To the shower head 7, a RF power of 13.56 MHz is applied in relation to the surface of the substrate heater 6 which is grounded. Thereby, the plasma of helium used as the carrier gas is generated below the shower head 7. In this case, the RF power should have a plasma energy in a level sufficient for only activating organic compounds A and B. The vaporized organic compounds A and B are activated while they are sprayed on the substrate 5 through the helium plasma. The preactivated organic compounds A and B are copolymerized on the surface of the substrate 5 which is heated at 250° C. Thereby, a polymer film (an insulation film) is produced on the substrate. In this process, the carrier gas containing the unreacted organic compounds A and B reaches the discharge pipe 16, and the unreacted organic compounds A and B are reliquefied (condensed) with the cold trap 14 which is cooled around 20° C. Thus, the unreacted organic compounds A and B do not get in the vacuum pump 8. Organic compounds A and B are supplied and the formation of the film is continued until the total amounts of organic compounds A and B reach predefined amounts. Then, the supply of organic compounds A and B is terminated. After that, the semiconductor substrate 5 is heated at 400° C. for 15 minutes and then removed from the reaction chamber.

The copolymerization of the compound of the formula (7) and trivinylcyclohexane may proceed as follows: The benzocyclobutene ring of the compound of the formula (7) is opened to form the 1,2-divinylidene moiety, which is then react with the vinyl group of trivinylcyclohexane by the Diels-Alder reaction. The copolymerization reaction of the monomers quickly proceeds, since the mixture of the vaporized monomers is passed through the plasma of the carrier gas just before it is sprayed on the substrate so that the monomers are activated with the plasma energy. The partial structure of the copolymer derived from trivinylcyclohexane comprises an aliphatic hydrocarbon group, while the partial structure derived from the compound of the formula (7) comprises an aromatic hydrocarbon group. These partial structures have greatly different heat resistance. Therefore, when the copolymer film is post-treated by heating, the partial structure derived from trivinylcyclohexane disappears and voids are formed in the copolymer film, and thus the copolylmer film has a decreased dielectric constant.

Figure 3:
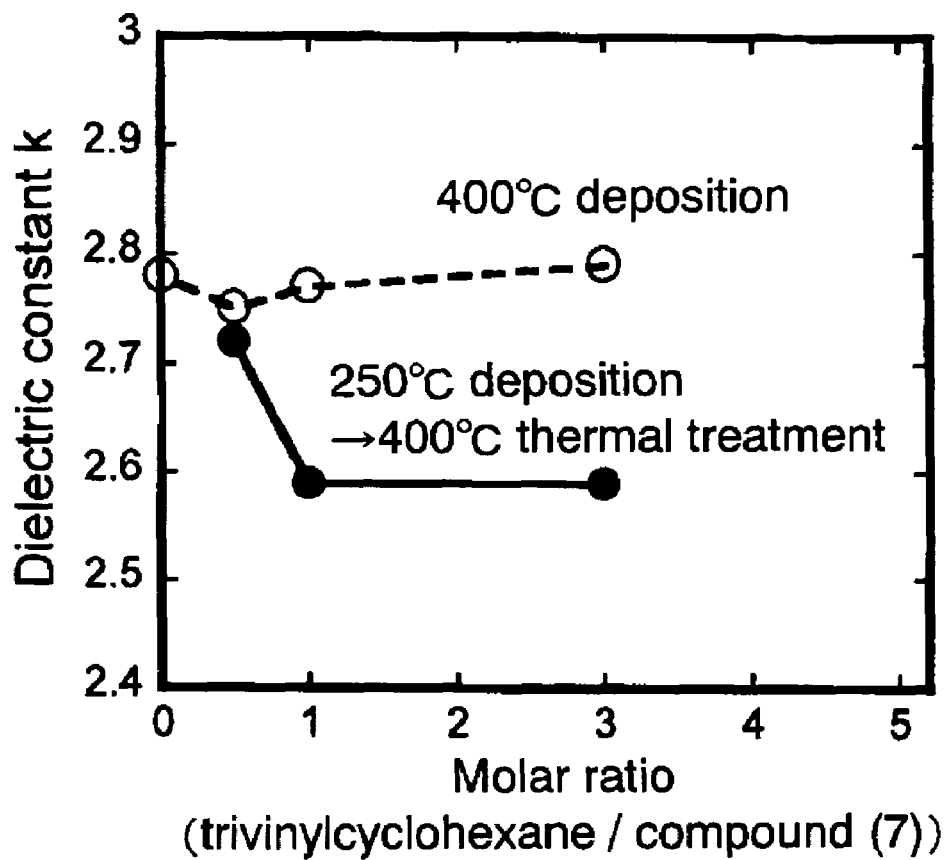
FIG. 3 is a graph showing a dielectric constant of the copolymer film produced in Example 1.

The dielectric constant of the copolymer film produced in Example 1 was measured with a mercury probe. The result is shown in FIG. 3.

What is claimed is:

1. A method for producing a copolymer film comprising the steps of:
    supplying at least two organic monomers as raw materials,
    forming a film of a copolymer comprising a backbone based on said least two monomers on a surface of a substrate, and
    heating the copolymer film at a temperature higher than a temperature at which the copolymer film is formed;
    wherein said film of the copolymer has a chemical structure which is formed from one of said organic monomers and is decomposed in the heating step and a chemical structure which is formed from the other one of the organic monomers and is not decomposed in the heating step, and wherein a temperature in the step of forming said film of the copolymer is lower than a temperature at which said former chemical structure of the copolymer is decomposed.

2. The method according to claim 1, wherein one of the said at least two organic monomers is a compound of the formula (1), (2) or (3):

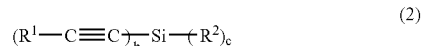

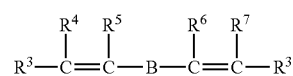

wherein a is an integer of 0 to 3, b is an integer of 0 to 4, c is an integer of 0 to 3 provided that the sum of b and c (b+c) is 4, A represents a mono- to tetravalent aromatic hydrocarbon group or a mono- to tetravalent heterocyclic aromatic group, $R^1$ represent independently of each other a hydrogen atom or a silyl group which may optionally have at least one substituent, provided that when two or more $R^1$ groups are present in one molecule, they may be the same or different, $R^2$ represents an alkyl group having 1 to 4 carbon atoms, an alkenyl group having 2 to 4 carbon atoms, an alkynyl group having 2 to 4 carbon atoms or an alkoxy group having 1 to 4 carbon atoms, B is a divalent aromatic hydrocarbon group or a divalent group of the formula (4):

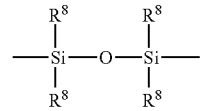

in which four $R^8$ groups represent independently of each other a hydrogen atom or a methyl group, two $R^3$ groups represent independently of each other a hydrogen atom or a hydrocarbon group having 1 to 10 carbon atoms, and $R^4$ to $R^7$ groups represent independently of each other a hydrogen atom or an aliphatic hydrocarbon group having 1 to 10 carbon atoms, and the other one of said at least two organic monomers is an aliphatic hydrocarbon compound.

3. The method according to claim 2, wherein A in the formula (1) is an aromatic hydrocarbon group.

4. The method according to claim 2, wherein $R^1$ is a hydrogen atom, an alkyl group having 1 to 4 carbon atoms or a trimethylsilyl group, and $R^2$ is a methyl group.

5. The method according to claim 2, wherein the suffix a in the formula (1) is 0 or 1.

6. The method according to claim 2, wherein the suffix b in the formula (2) is 1 or 2.

7. The method according to claim 2, wherein the compound of the formula (3) is a compound of the formula (7):

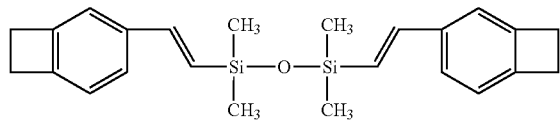

(7)

8. The method according to claim 2, wherein said aliphatic hydrocarbon compound has at least one carbon-carbon unsaturated bond.

9. The method according to claim 1, wherein the step for forming a film of a copolymer comprises the sub-steps of:

supplying a mixed gas containing at least two organic monomers into a reaction chamber under reduced pressure, passing said mixed gas through a plasma generated in said reaction chamber and spraying said mixed gas on said surface of the substrate heated to form said copolymer film comprising the backbone based on said at least two monomers on said surface of the substrate.

10. The method according to claim 1, wherein said copolymer film is heated at a temperature at least 100° C. higher than a temperature at which the copolymer film is formed.

11. The method according to claim 1, wherein said substrate is a semiconductor substrate.

* * * * *